United States Patent
Murthy et al.

(10) Patent No.: US 12,322,184 B2
(45) Date of Patent: Jun. 3, 2025

(54) SYSTEMS AND METHODS FOR FUSING DATA FROM SINGLE PIXEL THERMOPILES AND PASSIVE INFRARED SENSORS FOR COUNTING OCCUPANTS IN OPEN OFFICES

(71) Applicant: SIGNIFY HOLDING B.V., Eindhoven (NL)

(72) Inventors: Abhishek Murthy, Arlington, MA (US); Rohit Kumar, Acton, NJ (US); Jin Yu, Lexington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 529 days.

(21) Appl. No.: 17/787,317

(22) PCT Filed: Dec. 11, 2020

(86) PCT No.: PCT/EP2020/085802
§ 371 (c)(1),
(2) Date: Jun. 19, 2022

(87) PCT Pub. No.: WO2021/130034
PCT Pub. Date: Jul. 1, 2021

(65) Prior Publication Data
US 2023/0016414 A1   Jan. 19, 2023

Related U.S. Application Data

(60) Provisional application No. 62/953,787, filed on Dec. 26, 2019.

(30) Foreign Application Priority Data

Jan. 7, 2020  (EP) .................................... 20150400

(51) Int. Cl.
*G06V 20/52*   (2022.01)
*G01J 5/00*   (2022.01)
(Continued)

(52) U.S. Cl.
CPC ............ *G06V 20/52* (2022.01); *G01J 5/0025* (2013.01); *G01J 5/12* (2013.01); *G01P 13/00* (2013.01);
(Continued)

(58) Field of Classification Search
CPC ........... G01P 13/00; G01J 5/12; G01J 5/0025; G06V 10/147; G06V 20/52; G06V 10/143;
(Continued)

(56) References Cited

U.S. PATENT DOCUMENTS 9,795,005 B2   10/2017   Mans et al.
10,354,503 B1 *   7/2019   Kostrun ............... H05B 47/115
(Continued)

FOREIGN PATENT DOCUMENTS

JP   2009110688 A   5/2009
JP   2012155971 A   8/2012
(Continued)

OTHER PUBLICATIONS

Rui Ma, et al., "Active Compressive Sensing via Pyroelectric Infrared Sensor for Human Situation Recognition", IEEE Transactions on Systems, Man, and Cybernetics: Systems, vol. 47, No. 12, Dec. 2017, pp. 3340-3350.
(Continued)

*Primary Examiner* — Randy W Gibson

(57) ABSTRACT

A system for determining occupancy in an environment is provided. The system includes plurality of sensor bundles, with each bundle including a presence sensor and a motion sensor. The system further includes a controller in communication with each sensor bundle. The controller is configured to designate one of the sensor bundles as presence triggered if persons are present within a field of view of the presence sensor. The controller is further configured to
(Continued)

designate one of the sensor bundles as motion triggered if persons are moving within a field of view of the motion sensor. The controller is further configured to determine a triggered bundle count of the sensor bundles which are both presence triggered and motion triggered. The controller is further configured to determine an occupancy count for the environment based upon the triggered bundle count.

12 Claims, 5 Drawing Sheets

(51) Int. Cl.
   *G01J 5/12*      (2006.01)
   *G01P 13/00*     (2006.01)
   *G06V 10/143*    (2022.01)
   *G06V 10/147*    (2022.01)
   *H04N 7/18*      (2006.01)
   *H05B 47/115*    (2020.01)

(52) U.S. Cl.
   CPC .......... *G06V 10/143* (2022.01); *G06V 10/147* (2022.01); *G06F 2218/02* (2023.01); *G06F 2218/10* (2023.01); *H04N 7/188* (2013.01); *H05B 47/115* (2020.01)

(58) Field of Classification Search
   CPC . G06V 40/103; H05B 47/115; G06F 2218/02; G06F 2218/10; H04N 7/188
   See application file for complete search history.

(56) References Cited

U.S. PATENT DOCUMENTS

| | | | |
|---|---|---|---|
| 10,621,855 B2* | 4/2020 | Verhoeven | ........... G08B 29/185 |
| 12,213,226 B2* | 1/2025 | Casey | ........................ G06T 7/11 |
| 2012/0153868 A1* | 6/2012 | Gu | ........................ H05B 47/115 |
| | | | 315/307 |
| 2016/0003493 A1 | 1/2016 | Katz | |
| 2017/0024591 A1 | 1/2017 | Detter et al. | |
| 2017/0309038 A1 | 10/2017 | Dorster et al. | |
| 2017/0343499 A1 | 11/2017 | Wang | |
| 2019/0303661 A1 | 10/2019 | Krishnamurthy | |
| 2020/0245423 A1* | 7/2020 | Honjo | ................. F21V 23/0471 |
| 2024/0192650 A1* | 6/2024 | Ghungrudkar | ......... G05B 15/02 |

FOREIGN PATENT DOCUMENTS

| | | |
|---|---|---|
| JP | 2014202614 A | 10/2014 |
| JP | 2017134936 A | 8/2017 |
| WO | 2013060859 A1 | 5/2013 |

OTHER PUBLICATIONS

Tong Liu, et al., "Elderly-Falling Detection Using Distributed Direction-Sensitive Pyroelectric Infrared Sensor Arrays", Multidimensional Systems and Signal Processing; An International Journal, Kluwer Academic Publishers, BO, vol. 23, No. 4, Oct. 15, 2011, pp. 451-467.

* cited by examiner

SYSTEMS AND METHODS FOR FUSING DATA FROM SINGLE PIXEL THERMOPILES AND PASSIVE INFRARED SENSORS FOR COUNTING OCCUPANTS IN OPEN OFFICES

CROSS-REFERENCE TO PRIOR APPLICATIONS

This application is the U.S. National Phase application under 35 U.S.C. § 371 of International Application No. PCT/EP2020/085802, filed on Dec. 11, 2020, which claims the benefits of European Patent Application No. 20150400.8, filed on Jan. 7, 2020, and U.S. Patent Application No. 62/953,787, filed on Dec. 26, 2019. These applications are hereby incorporated by reference herein.

FIELD OF THE DISCLOSURE

The present disclosure is directed generally to counting occupants in an environment, such as an open office.

BACKGROUND

A modern open office environment will typically include a plurality of smart luminaires electrically connected via a connected lighting system. These smart luminaires are often equipped with a variety of sensors to collect data from the open office environment. By using information collected from a variety of different sensors, various characteristics of the open office may be determined. One such important characteristic is office occupancy.

One example of a sensor which may be utilized in a connected lighting system is a single-pixel thermopile (SPT). An SPT measures the temperature in its field of view using a thermocouple. The thermocouple consists of two dissimilar conductors, a hot weld and a cold weld. A temperature difference over the thermocouple generates an electrical voltage. The cold weld of the thermocouple is insulated and only measures the SPT case temperature. The hot weld is exposed to the field of view and absorbs the heat emitted by people in the field of view. The temperature of the objects in the field of view is then reported by the sensor as the object temperature, $T_o$. The sensor also reports the case temperature as the ambient temperature, $T_a$. However, one dimensional $T_o$ measurements typically do not contain data sufficient to determine an accurate count of occupants.

A second example of a sensor which may be utilized in a connected lighting system is a Passive Infrared (PIR) sensor. A PIR may be used to report both the binary occupancy of the room (occupied or non-occupied), as well as the type of movement that is seen in its field of view. Specifically, minor, medium, and major motions may be reported. When a PIR-equipped luminaire is installed and commissioned in an office environment, the PIR generates counts of events corresponding to minor, medium, major, and no motion. The motion counts are generated according to a sampling rate based on the networking connection of the lighting system.

US 2019303661 A1 discloses a system comprises a first detector for detecting whether a multi-occupancy space is occupied by at least one individual and a plurality of second detectors for detecting whether an individual is present in each of a respective plurality of spaces within the multi-occupancy space. A controller is configured to monitor whether an individual is present in the multi-occupancy space based on a signal derived from the first detector. If the presence of at least one individual is detected based on the signal derived from the first detector, the controller determines occupancy of the multi-occupancy space based on signals derived from the plurality of second detectors.

SUMMARY OF THE DISCLOSURE

The present disclosure is directed to inventive systems and methods for counting occupants in an environment, such as an open office. The systems and methods analyze data collected by presence sensors, such as single pixel thermopiles (SPTs), and motion sensors, such as passive infrared (PIR) sensors. Fusing data collected by presence and motion sensors provides greater precision in occupancy counting.

Generally, in one aspect, a system for determining occupancy in an environment is provided. The system may include a plurality of sensor bundles. Each sensor bundle may include a presence sensor. The presence sensor may be configured to generate a presence signal. The presence sensors may be SPTs.

Each sensor bundle may include a motion sensor. The motion sensor may be configured to generate a motion signal. The motion sensors may be PIR sensors.

The system may further include a controller. The controller may be in communication with each sensor bundle. The controller may be configured to designate one of the sensor bundles as presence triggered if one or more persons are present within a field of view of the presence sensor of the sensor bundle based on the presence signal and a presence detector.

The presence detector may include a step analysis module to determine if one or more persons are present in the field of view of the presence sensor. The step analysis module may be configured to generate a convolution presence signal by convolving the presence signal and a step function. The presence detector may be further configured to analyze the convolution presence signal for one or more peaks. The peaks may correspond to one or more persons being present in the field of view of the presence sensor. The designation of the sensor bundle as presence triggered may be further based upon the peaks of the convolution presence signal.

The controller may be further configured to designate one of the sensor bundles as motion triggered if one or more persons are moving within a field of view of the motion sensor of the sensor bundle based on the motion signal and a motion detector. The motion detector may include a motion threshold. The motion detector may include an analysis period.

The controller may be further configured to determine a triggered bundle count of the sensor bundles which are both presence triggered and motion triggered.

The controller may be further configured to determine an occupancy count for the environment based upon the triggered bundle count. The occupancy count may be further based on an occupancy count module. The occupancy count module may be configured to correlate one or more triggered bundle counts to one or more occupancy counts.

Generally, in one aspect, a method for determining occupancy in an environment is provided. The method may include generating a plurality of presence signals. Each presence signal may correspond to a presence sensor of one of a plurality of sensor bundles.

The method may further include generating a plurality of motion signals. Each motion signal may correspond to a motion sensor of one of the sensor bundles.

The method may further include designating, via a controller, one of the sensor bundles as presence triggered if one or more persons are present within a field of view of the presence sensor of the sensor bundle based on the presence signal and a presence detector.

The method may further include generating, via a controller, a convolution presence signal by convolving the presence signal and a step function.

The method may further include analyzing, via a controller, the convolution presence signal for one or more peaks, wherein the peaks correspond to one or more persons being present in the field of view of the presence sensor. Designating the sensor bundle as presence triggered may be further based upon the peaks of the convolution presence signal.

The method may further include designating, via the controller, one of the sensor bundles as motion triggered if one or more persons are moving within a field of view of the motion sensor of the sensor bundle based on the motion signal and a motion detector. The motion detector may include a motion threshold. The motion detector may include an analysis period.

The method may further include determining, via the controller, a triggered bundle count of the sensor bundles which are both presence triggered and motion triggered.

The method may further include determining, via the controller, an occupancy count for the environment based upon the triggered bundle count. The occupancy count may be further based upon correlating, via an occupancy count module, one or more triggered bundle counts to one or more occupancy counts.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects as discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed to inventive systems and methods for counting occupants in an environment, such as an open office. The systems and methods analyze data collected by presence sensors, such as single pixel thermopiles (SPTs), and motion sensors, such as passive infrared (PIR) sensors, each found in sensor bundles of connected lighting systems. Analyzing data collected by two or more different types of sensors provides greater precision in occupancy counting, especially in cases where occupants are sitting relatively still for prolonged periods of time. In the case of SPTs, the quiescent periods of the PIR sensors are used to find baselines of the SPTs. This baseline corresponds to the SPT having an unoccupied field of view. Data collected by the SPTs may be analyzed using a step analysis, in which determines the presence (or lack thereof) of one or more persons in the field of view of each SPT. Further, data collected by the PIR sensors may be analyzed to determine if a person is moving in the field of view of each PIR. The system then totals the number of sensor bundles with sensors detecting both presence and motion, and correlates this total to an estimated occupancy count value.

Figure 1:
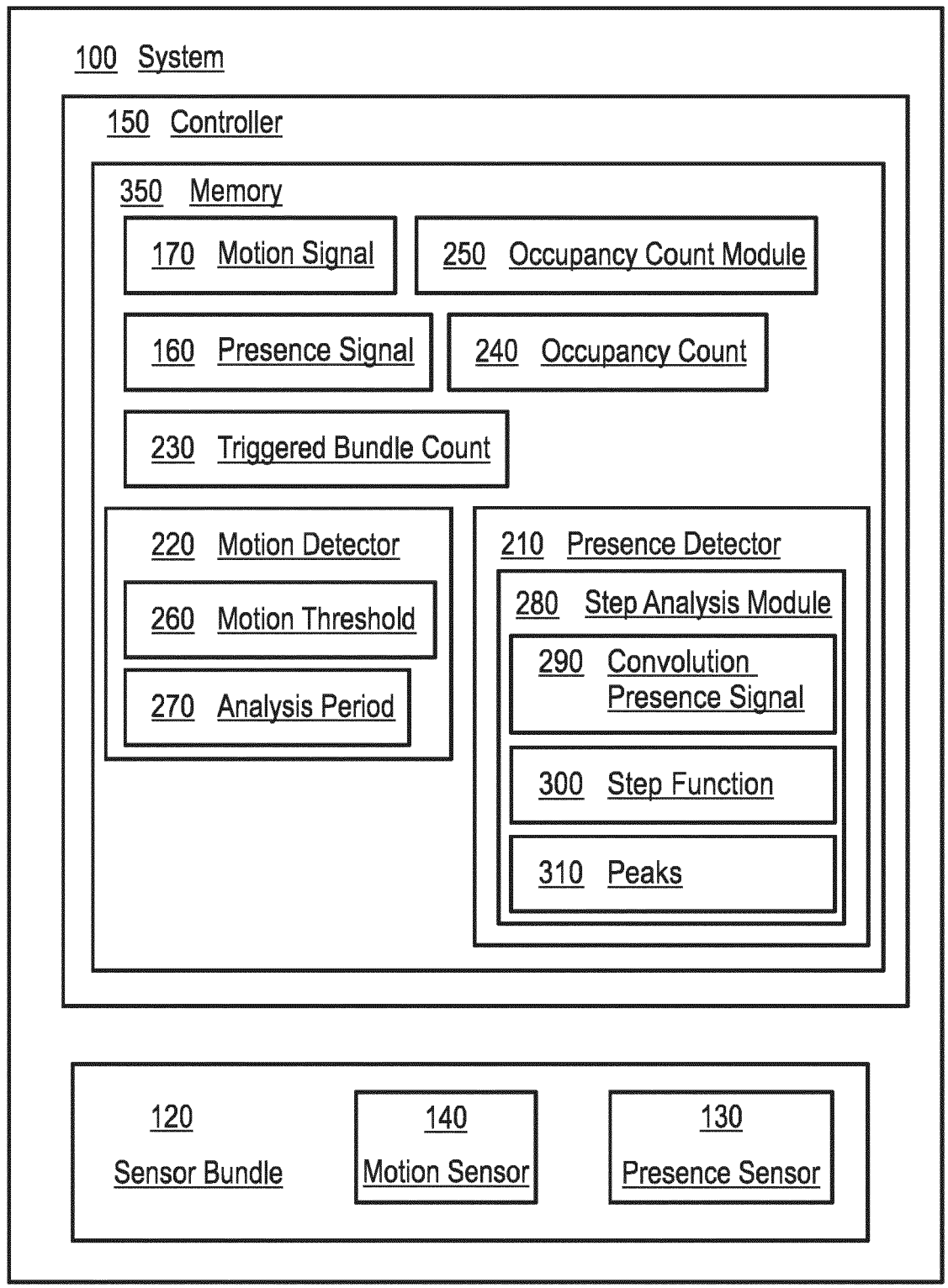
FIG. 1 is a schematic of a system for occupancy counting, in accordance with an example.
Figure 2:
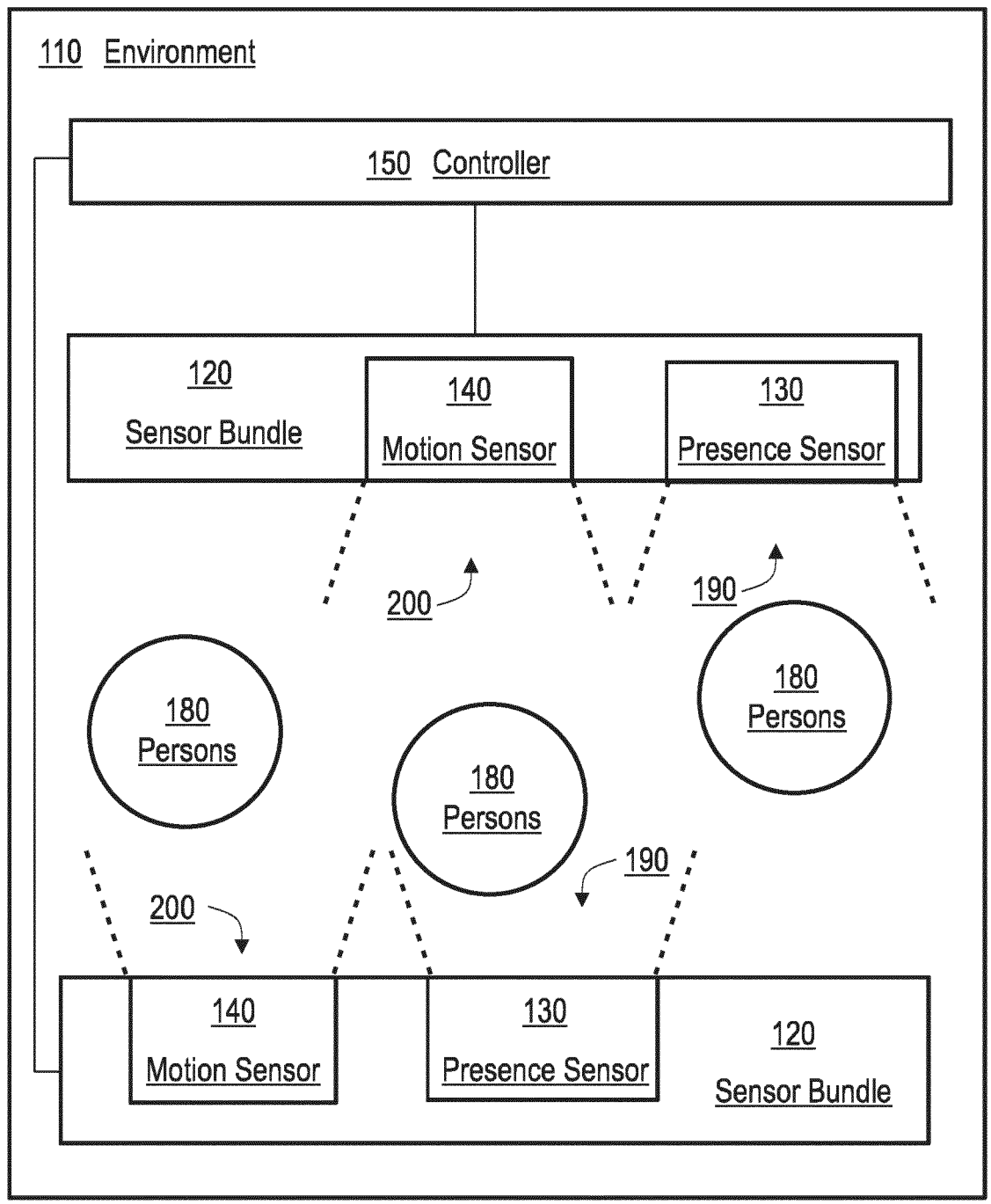
FIG. 2 is a further schematic of a system for occupancy counting, in accordance with an example.

With reference to FIGS. 1 and 2, in one aspect, a system 100 for determining occupancy in an environment 110 is provided. The environment 110 may be an indoor or outdoor area for which it would be advantageous to determine occupancy. In one example, the environment 110 may be an individual office in an office building. The system 100 may be electrically connected to a lighting system for the environment 110. The lighting system may be responsive to occupancy of the environment 110. In some examples, the lighting system may dim or deactivate one or more luminaires in low occupancy cases. In other examples, the lighting system may brighten or activate one or more luminaires in high occupancy cases.

The system 100 may include a plurality of sensor bundles 120. The sensor bundles 120 may be installed in conjunction with the lighting system. In one such example, one or more sensor bundles 120 may be affixed to a housing of one or more luminaires of the lighting system.

Figure 3A:
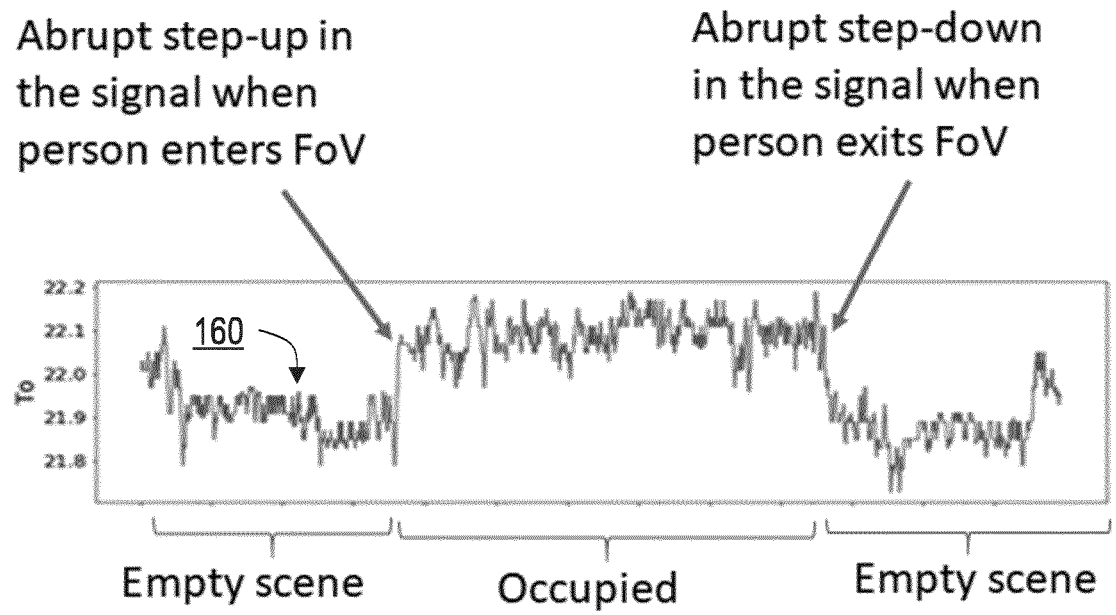
FIGS. 3A to 3D are example presence signals undergoing signal processing.
Figure 3B:
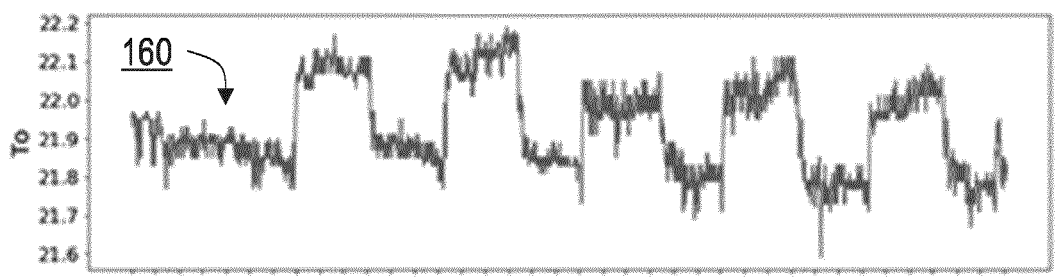

Each sensor bundle 120 may include a presence sensor 130. The presence sensor 130 may be configured to generate a presence signal 160. The presence signal 160 may be an electronic representation of presence of one or more persons 180 within a field of view 190 of the presence sensor 130. The presence sensors 130 may be SPTs. An SPT generates a presence signal 160 in terms of temperature. Example presence signals 160 captured by an SPT are shown in FIGS. 3A and 3B. In these example signals, the measured temperature noticeably increases, or "steps up" in the presence of one or more persons 180. In other examples, the presence sensors 130 may be any sensors or plurality of sensors, passive or active, capable of detecting presence. In some examples, the presence sensors 130 will be positioned, as part of the sensor bundle 120, in an office to detect presence of one or more persons 180 within the office. The sensor bundles 120 may be configured to transmit the presence signals 160.

Each sensor bundle 120 may include a motion sensor 140. The motion sensor 140 may be configured to generate a motion signal 170. The motion signal 170 may be an electronic representation of movement of one or more persons 180 within a field of view 200 of the motion sensor 140. The motion sensors 140 may be PIR sensors. In other examples, the motion sensors 140 may be any sensors or plurality of sensors, passive or active, capable of detecting motion. In some examples, the motion sensors 140 will be positioned in an office to detect motion of one or more persons 180 within the office. The motion signals 140 may include data designating each detected motion as a "minor", "medium", or "major" motion. The sensor bundles 120 may be configured to transmit the motion signals 170.

The system 100 may further include a controller 150. The controller 150 may include a memory 350 and a processor. The controller 150 may be in communication with each sensor bundle 120. The communication may be wired and/or wireless, depending on the application. The controller 150 may be configured to receive the presence signals 160 transmitted by the sensor bundles 120. Similarly, the controller may be configured to receive the motion signals 170 transmitted by the sensor bundles 120.

The controller 150 may be configured to designate one of the sensor bundles 120 as presence triggered if one or more persons 180 are present within a field of view 190 of the presence sensor 130 of the sensor bundle 120 based on the presence signal 160 and a presence detector 210. The presence detector 210 comprises criteria, such as algorithms and variables, used by the controller 150 to analyze the presence signal 160. In one example, the controller 150 may analyze the presence signal 160 for criteria defined by the presence detector 210 indicative of presence of one or more persons 180, and therefore, an occupied field of view 190. Similarly, the controller 150 may be configured to remove the presence triggered designation of the sensor bundle 120 if one or more persons 180 are no longer present within the field of view 190 of the presence sensor 130 based on the presence signal 160 and the presence detector 210.

The presence detector 210 may include a step analysis module 280 to determine if one or more persons 180 are present in the field of view 190 of the presence sensor 130. The step analysis module 280 may be configured to analyze the presence signal 160 for one or more "steps up" and "steps down" in temperature. A "step up" in temperature is likely indicative of a person 180 entering the field of view 190 of the presence sensor 130, while a "step down" is likely indicative of a person 180 leaving. Example presence signals 160 are shown in FIGS. 3A and 3B. In these example signals, the measured temperature noticeably increases, or "steps up" when one or more persons 180 are in the field of view of the presence sensor 160.

Figure 3C:
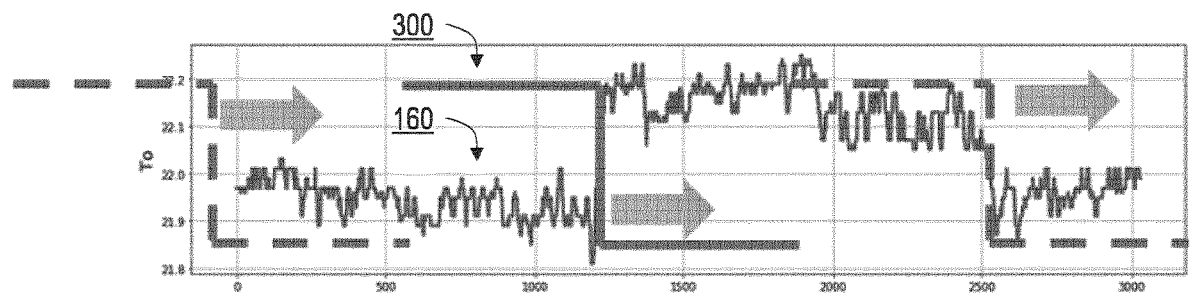
Figure 3D:
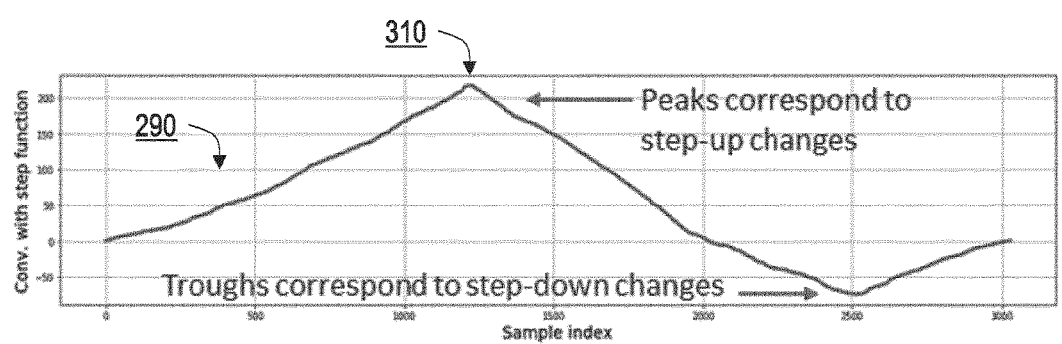
Figure 4:
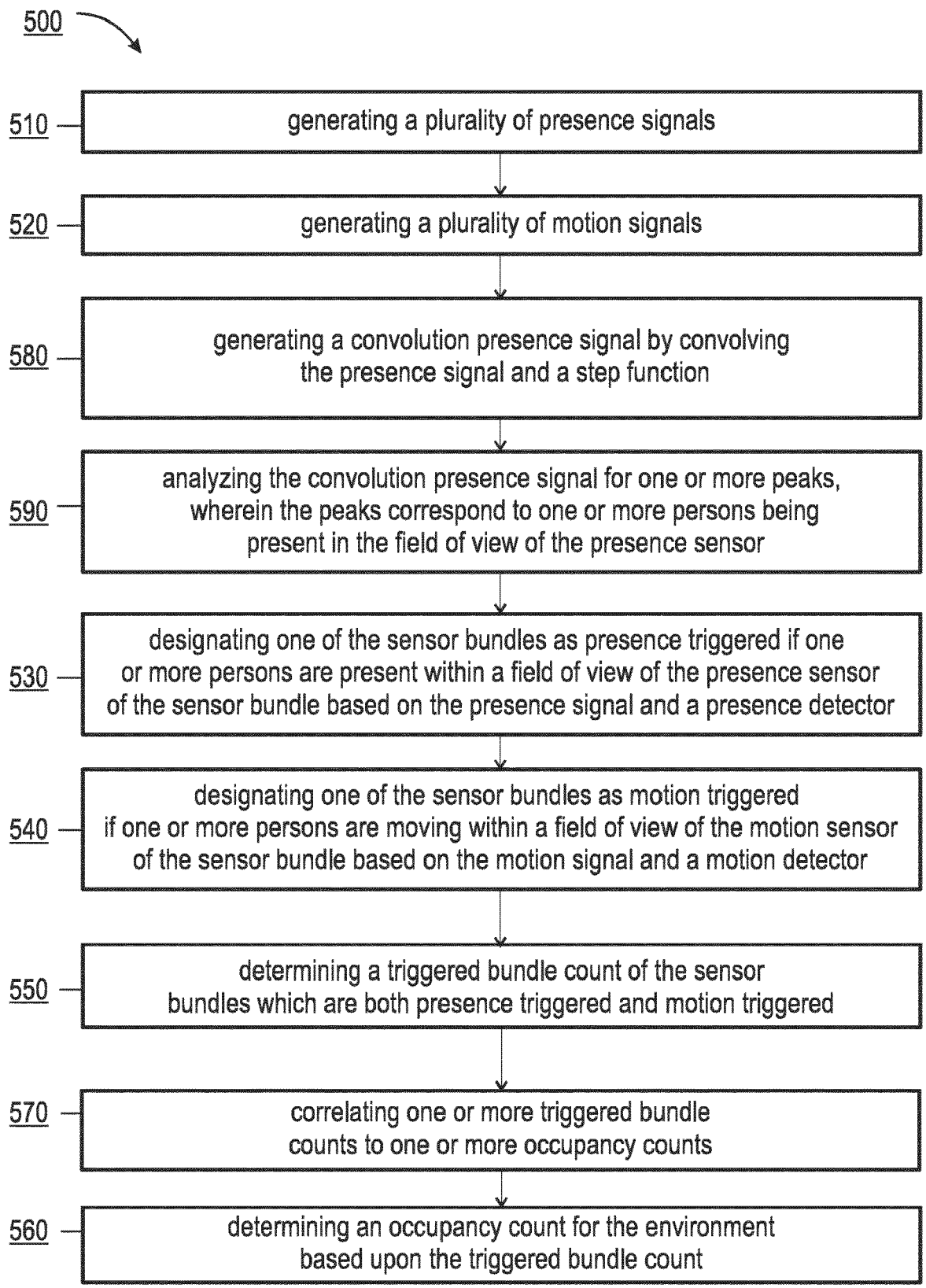
FIG. 4 is a flowchart of a method for occupancy counting, in accordance with an example.

With reference to FIGS. 3C and 3D, the step analysis module 280 may be configured to generate a convolution presence signal 290 by convolving the presence signal 160 and a step function 300. The convolution presence signal 290 is shown in FIG. 3D. The presence detector 210 may be further configured to analyze the convolution presence signal 290 for one or more peaks 310. The peaks 310 may correspond to one or more persons 180 being present in the field of view 190 of the presence sensor 130. As shown in FIGS. 3C and 3D, the convolution presence signal 290 will peak if the shape of the presence signal 160 corresponds to the step function 300. More specifically, the convolution presence signal 160 will peak 310 (or crest) to a maximum value during a "step up", and fall (or trough) to a minimum value during a "step down". By further processing the convolution presence signal 290 for peak 310 detection, the controller 150 may determine if a "step up" or "step down" has occurred, and then further determine if a person 180 has entered or left the field of view 190 of the presence sensor 130. The designation of the sensor bundle 120 as presence triggered may be further based upon the peaks 310 of the convolution presence signal 290.

The controller 150 may be further configured to designate one of the sensor bundles 120 as motion triggered if one or more persons 180 are moving within a field of view 200 of the motion sensor 140 of the sensor bundle 120 based on the motion signal 170 and a motion detector 220. The motion detector 220 comprises criteria, such as algorithms and variables, used by the controller 150 to analyze the motion signal 170. Similarly, the controller 150 may be configured to remove the motion triggered designation of the sensor bundle 120 if one or more persons 180 are no longer moving within the field of view 200 of the motion sensor 140 based on the motion signal 170 and a motion detector 220.

In one example, the controller 150 may analyze the motion signal 170 for criteria defined by the motion detector 220 indicative of motion of one or more persons 180, and therefore, an occupied field of view 200 of the motion sensor 140.

The motion detector 220 may include a motion threshold 260. In one example, if the amplitude of the motion signal 170 exceeds the motion threshold 260, the field of view 200 of the motion sensor 140 is presumed to be occupied by one or more persons 180. If the amplitude of the motion signal 170 fails to exceed the motion threshold 260, the field of view 200 is presumed to be unoccupied. The motion threshold 260 may be optimized according to the field of view 200 and/or the environment 110.

The motion detector 220 may include an analysis period 270. The analysis period 270 is the length of the time the controller 150 will analyze the motion signal 170 to determine if one or more persons 180 are moving in the field of view 200 of the motion sensor 140. In one example, if the motion signal 170 fails to exceed the motion threshold 260 during the analysis period 270, the controller 150 may determine that the field of view 200 is unoccupied.

The motion detector 220 may include any other algorithms, values, or variables useful to analyze the motion signal 170 for human motion.

The controller 150 may be further configured to determine a triggered bundle count 230 of the sensor bundles 120 which are both presence triggered and motion triggered. In one example, the triggered bundle count 230 is the sum of the sensor bundles 120 in the environment 110 which are both presence triggered and motion triggered. In other examples, certain sensor bundles 120 may be excluded from the triggered bundle count 230 for a variety of reasons, such as environmental conditions or sensor bundle 120 placement. In an example, the motion signal may be used to correct the presence sensor data, such as the convolution presence signal 290 for one or more peaks 310, the motion signal is analysed for motion in the field of view in the environment, if the motion sensor also senses the motion, the peaks may be corresponding to one or more persons 180 being present in the field of view 190 of the presence sensor (130).

The controller 150 may be further configured to determine an occupancy count 240 for the environment 110 based upon the triggered bundle count 230. The occupancy count 240 may be further based on an occupancy count module 250. The occupancy count module 250 may be configured to correlate one or more triggered bundle counts 230 to one or more occupancy counts 240. The correlation between triggered bundle count 230 and occupancy count 240 will typically be a direct relationship, where the occupancy count 240 increases with an increased triggered bundle count 230. Further, the correlation will likely depend on the placement of the sensor bundles 120 in the environment. In one example, the occupancy count module 250 may correlate a triggered bundle count 230 of three (3) sensor bundles 120 to an occupancy count of four (4) persons 180. The correlation utilized by the occupancy count module 250 may be determined via computer simulation, historical data, or a combination of both.

Generally, in one aspect, a method 500 for determining occupancy in an environment is provided. The method may include generating 510 a plurality of presence signals. Each presence signal may correspond to a presence sensor of one of a plurality of sensor bundles.

The method may further include generating 520 a plurality of motion signals. Each motion signal may correspond to a motion sensor of one of the sensor bundles.

The method may further include designating 530, via a controller, one of the sensor bundles as presence triggered if one or more persons are present within a field of view of the presence sensor of the sensor bundle based on the presence signal and a presence detector.

The method may further include generating 580, via a controller, a convolution presence signal by convolving the presence signal and a step function.

The method may further include analyzing 590, via a controller, the convolution presence signal for one or more peaks, wherein the peaks correspond to one or more persons being present in the field of view of the presence sensor. Designating 530 the sensor bundle as presence triggered may be further based upon the peaks of the convolution presence signal.

The method may further include designating 540, via a controller, one of the sensor bundles as motion triggered if one or more persons are moving within a field of view of the motion sensor of the sensor bundle based on the motion signal and a motion detector. The motion detector may include a motion threshold. The motion detector may include an analysis period.

The method may further include determining 550, via the controller, a triggered bundle count of the sensor bundles which are both presence triggered and motion triggered.

The method may further include determining 560, via the controller, an occupancy count for the environment based upon the triggered bundle count. The occupancy count may be further based upon correlating 570, via an occupancy count module, one or more triggered bundle counts to one or more occupancy counts.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A system for determining occupancy in an environment, comprising:
   a plurality of sensor bundles, each sensor bundle comprising:
   a presence sensor configured to generate a presence signal; and
   a motion sensor configured to generate a motion signal; and
   a controller in communication with each sensor bundle, the controller configured to:
   designate one of the sensor bundles as presence triggered if one or more persons are present within a field of view of the presence sensor of the sensor bundle based on the presence signal and a presence detector; wherein the presence detector comprises criteria used by the controller to analyze the presence signal indicative of presence of one or more persons;
   designate one of the sensor bundles as motion triggered if one or more persons are moving within a field of view of the motion sensor of the sensor bundle based on the motion signal and a motion detector; wherein the motion detector comprises criteria used by the controller to analyze the motion signal indicative of motion of one or more persons;
   determine a triggered bundle count of the sensor bundles which are both presence triggered and motion triggered; and
   determine an occupancy count for the environment based upon correlating, via an occupancy count module, one or more triggered bundle count to one or more occupancy counts.

2. The system of claim 1, wherein the motion detector comprises a motion threshold.

3. The system of claim 1, wherein the motion detector comprises an analysis period; wherein the analysis period is the length of the time the controller will analyze the motion signal to determine if one or more persons are moving in the field of view of the motion sensor.

4. The system of claim 1, wherein the presence detector comprises a step analysis module to determine if one or more persons are present in the field of view of the presence sensor, wherein the step analysis module is configured to:
   generate a convolution presence signal by convolving the presence signal and a step function; and
   analyze the convolution presence signal for one or more peaks, wherein the peaks correspond to one or more persons being present in the field of view of the presence sensor.

5. The system of claim 4, wherein the designation of the sensor bundle as presence triggered is further based upon the peaks of the convolution presence signal.

6. The system of claim 1, wherein the motion sensors are passive infrared sensors.

7. The system of claim 1, wherein the presence sensors are single-pixel thermopiles.

8. A method for determining occupancy in an environment, comprising:
   generating a plurality of presence signals, wherein each presence signal corresponds to a presence sensor of one of a plurality of sensor bundles;
   generating a plurality of motion signals, wherein each motion signal corresponds to a motion sensor of one of the sensor bundles;
   designating, via a controller, one of the sensor bundles as presence triggered if one or more persons are present within a field of view of the presence sensor of the sensor bundle based on the presence signal and a presence detector; wherein the presence detector comprises criteria used by the controller to analyze the presence signal indicative of presence of one or more persons;
   designating, via the controller, one of the sensor bundles as motion triggered if one or more persons are moving within a field of view of the motion sensor of the sensor bundle based on the motion signal and a motion detector; wherein the motion detector comprises criteria used by the controller to analyze the motion signal indicative of motion of one or more persons;
   determining, via the controller, a triggered bundle count of the sensor bundles which are both presence triggered and motion triggered; and
   determining, via the controller, an occupancy count for the environment based upon correlating, via an occupancy count module, one or more triggered bundle count to one or more occupancy counts.

9. The method of claim 8, wherein the motion detector comprises a motion threshold.

10. The method of claim 8, wherein the motion detector comprises an analysis period; wherein the analysis period is the length of the time the controller will analyze the motion signal to determine if one or more persons are moving in the field of view of the motion sensor.

11. The method of claim 8, further comprising:
    generating a convolution presence signal by convolving the presence signal and a step function; and
    analyzing the convolution presence signal for one or more peaks, wherein the peaks correspond to one or more persons being present in the field of view of the presence sensor.

12. The method of claim 11, wherein the designating of the sensor bundle as presence triggered is further based upon the peaks of the convolution presence signal.

* * * * *